United States Patent [19]

Zatulovsky

[11] Patent Number: 4,942,664
[45] Date of Patent: Jul. 24, 1990

[54] STRING TRIMMER WITH AUTOMATIC FEED

[75] Inventor: Leonid Zatulovsky, Arleta, Calif.

[73] Assignee: Allegretti & Company, Chatsworth, Calif.

[21] Appl. No.: 198,992

[22] Filed: May 26, 1988

[51] Int. Cl.⁵ .......................... B26B 7/00; A01G 3/06
[52] U.S. Cl. ......................................... 30/276; 30/347
[58] Field of Search ............... 30/276, 347; 56/12.7, 56/295

[56] References Cited

U.S. PATENT DOCUMENTS 4,161,820  7/1979  Moore .................................. 30/276
4,672,798  7/1987  Ota .................................. 30/276 X Primary Examiner—Douglas D. Watts
Attorney, Agent, or Firm—Lyon & Lyon

[57] ABSTRACT

A string trimmer with automatic feed including a cap member, a body member and a spool within the body member which has the line wound thereon. When the cap member is contacted with the ground, the cap member is temporarily restrained thereby rotating relative to the body member. The relative rotation of the cap member actuates a mechanism which releases the body member from the spool allowing the body member to rotate relative to the spool thereby releasing a length of line.

10 Claims, 2 Drawing Sheets

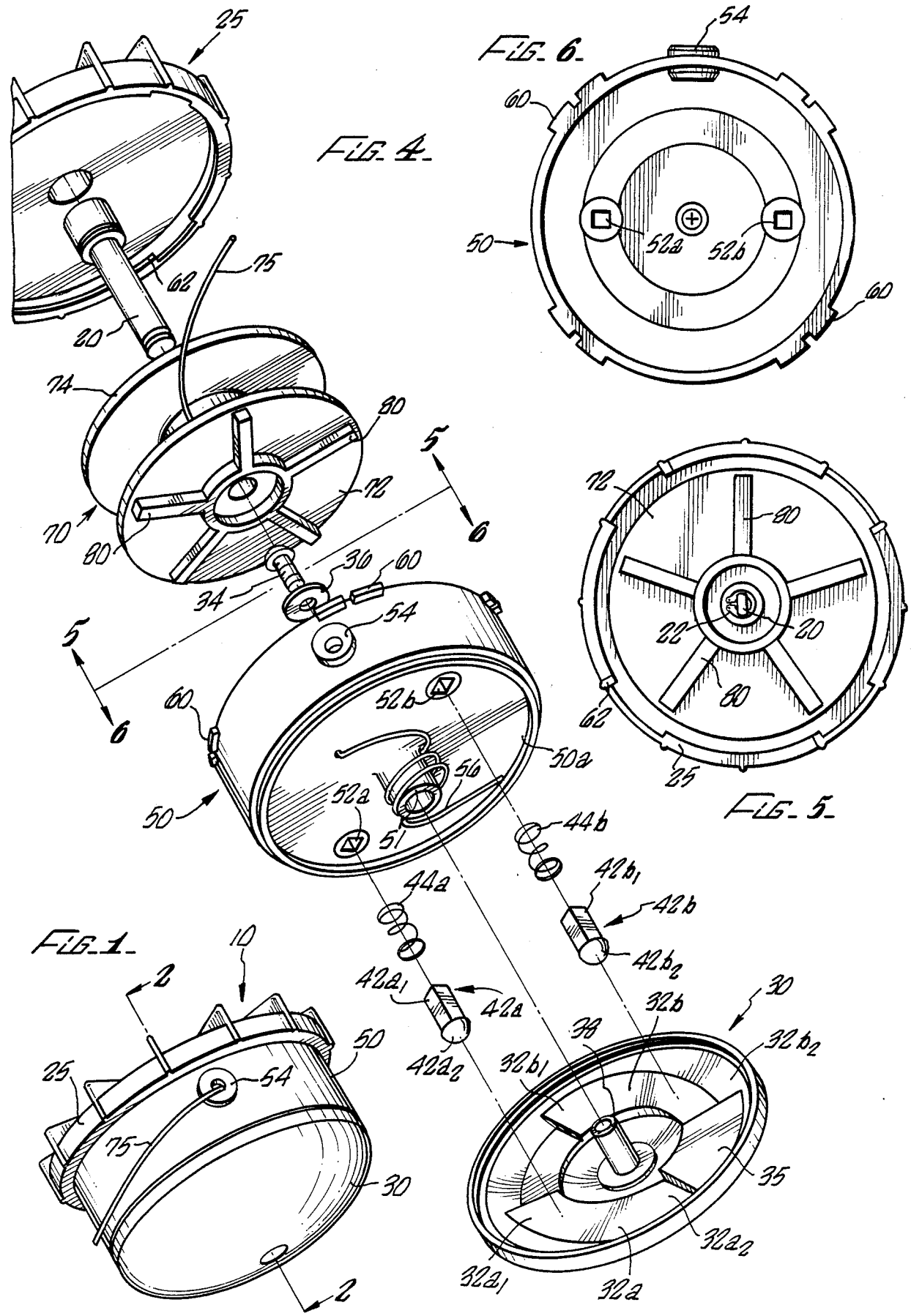

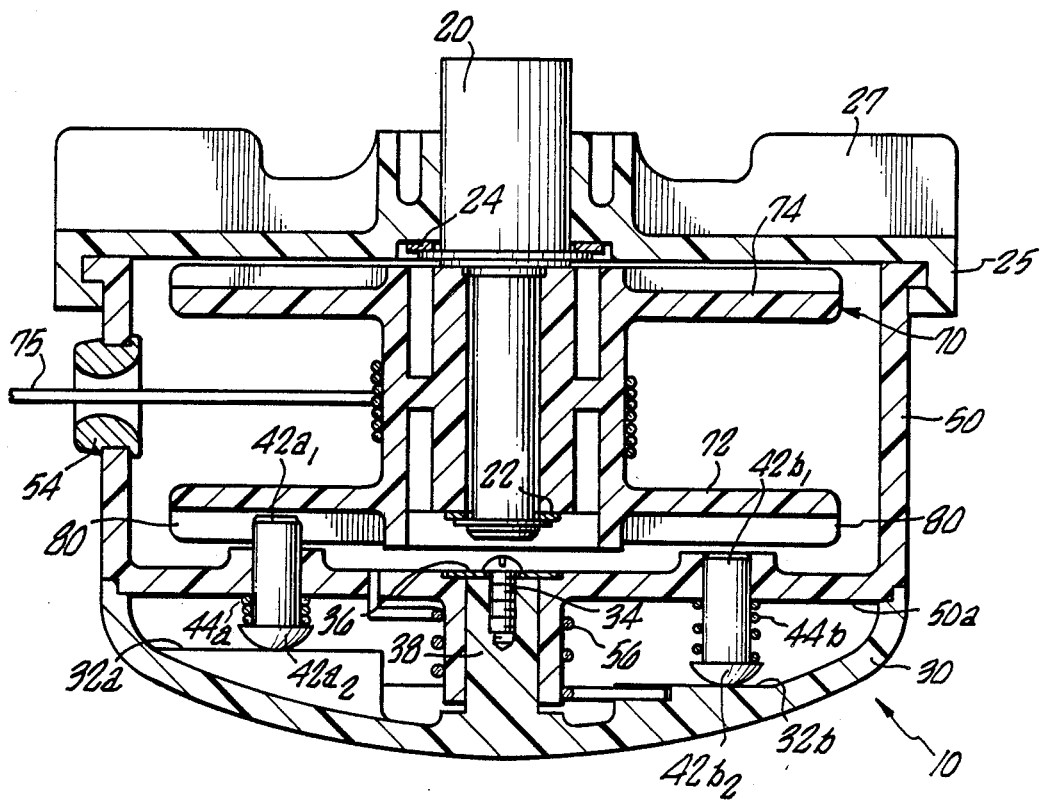
FIG_2_
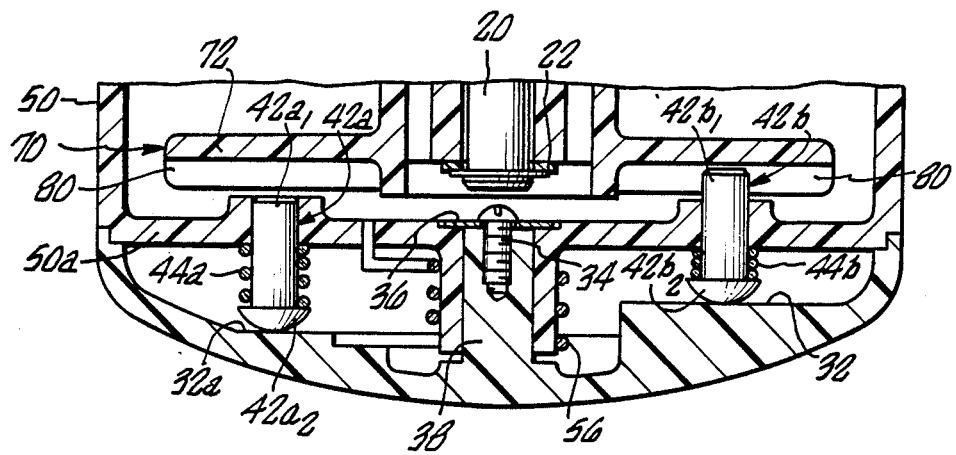
FIG_3_

STRING TRIMMER WITH AUTOMATIC FEED

BACKGROUND OF THE INVENTION

The field of the present invention relates to string trimmer devices. A string trimmer is a rotary mowing device using a flexible filament as a cutting mechanism. A string trimmer typically uses a plastic filament line mounted on a spool and rotated through a drive means to create the cutting action. When breakage or wear of the line occurs through impact with objects, fatigue or the like, additional filament needs to be unwound from the spool to replace the lost portion. For efficient use of filament, it is generally desirable that only a given amount of line be unwound when required.

Early generation string trimmers had to be stopped to permit manual extension of line to replace the broken portion. Such a procedure was inefficient and undesirable. One approach for automatic feed is the "bump feed" mechanism such as disclosed in Proulx, U.S. Pat. No. 4,203,212 or as in Oberg, U.S. Pat. No. 4,524,515. The Oberg device includes a driven member with a spool insertable therein. Ratchet means are included on the driven member and the spool, and spacing is provided between the driven member and the spool to allow for axial displacement of the spool to engage and disengage the ratchet means. When a ground engaging hub is contacted with the ground, the spool is axially displaced disengaging the spool, allowing it to rotate thereby unwinding a length of line therefrom. The bump feed trimmer requires the spool and the ground contacting hub to be axially displaceable and the operator must "bump" the head of the trimmer hard enough to cause the axial displacement.

Bumping the trimmer on the ground could damage the trimmer especially if the operator applies a greater "bump" than that needed to release additional line. It is therefore desirable to have a string trimmer with automatic feed of alternate design, preferably one with a minimum of moving parts.

SUMMARY OF THE INVENTION

The present invention is directed to a string trimmer with automatic feed which does not require the operator to stop the device to feed out additional line. The string trimmer includes a cap member, a body member and a spool therein which has the line wound thereon. Ordinarily the body member, the spool and the cap member all rotate together. A line feeding means releases a length of line when the cap member is contacted with the ground. When the cap member is contacted with the ground, the cap member is temporarily restrained thereby rotating relative to the body member. The relative rotation of the cap member actuates a mechanism which releases the body member from the spool allowing the body member to rotate relative to the spool thereby releasing a length of line. If required, when the cap member is removed from the ground, a biasing means may return the cap member to its original position relative to the body member.

BRIEF DESCRIPTION OF THE DRAWINGS

FIG. 1 is a perspective view of the drag feed head according to the preferred embodiment of the present invention;

FIG. 2 is a cross-sectional view of FIG. 1 taken along the line 2—2 and showing the cap member in a first position;

FIG. 3 illustrates a portion of FIG. 2 in cross-section showing the cap member in a second position;

FIG. 4 is an exploded perspective view of the drag feed head;

FIG. 5 is a plan view of the spool showing an outward face of the spool; and

FIG. 6 is a plan view of the body member showing an inward face of the body member.

DETAILED DESCRIPTION OF THE PREFERRED EMBODIMENT

The preferred embodiment of the present invention will now be described with reference to the drawings. For convenience of description, any numeral representing an element in one figure will represent the same element in any other figure.

FIG. 1 generally illustrates a drag feed head 10. The head 10 has a cap member 30, a body member 50 and a rear plate 25. A filament line 75 is fed out through a line port 54 within the body member 50. The head 10 may then be connected to a drive means (not shown) such as a motor or engine which may be attached to a handle to be held by the operator.

The elements of the drag feed head 10 will now be described with reference to FIGS. 2-6. The head 10 is comprised primarily of a cap member 30, a body member 50, a spool 70, a shaft 20, and a rear plate 25. The spool 70 has the filament line 75 wound around its inner core. The spool 70 has a rear disc or plate 74 and a front disc or plate 72 which between them forms an inner cavity where the filament line 75 is wound. On the front of the front disc 72 are a series of stops 80 extending outward from the front disc 72 and radially spaced thereabout. The function of the stops 80 is described below.

The spool 70 is attached to the main shaft 20 by a locking clip 22 at the front disc 72 and a locking clip 24 at the rear disc 74.

The body member 50 is a cylindrical container which can accept the insertion of the spool 70. The body member 50 has a front face with a tubular extending portion 51 (visible in FIG. 4) into which the screw retainer 38 of the cap member 30 may be inserted. The body member 50 has a pair of pin holes 52a and 52b therethrough located opposite each other through the front face 50a. When the spool 70 is inserted into the body member 50, the line 75 is threaded through the line port 54 in the side wall of the body member 50.

The cap member 30 has the screw retainer 38 which is inserted into the tubular extension 51 of body member 50. The cap member 30 is then axially connected to the body member 50 by a washer 36 and a screw 34 which is screwed down into the screw retainer 38. Though the screw retainer 38 is axially secured to the extended portion 51 of the cap member 30, the screw retainer 38 fits loosely within the extended portion 51 so the cap member 30 may be rotatable relative to the body member 50.

The cap member 30 has a pair of ramps 32a and 32b on the inner face thereof. Each ramp has a raised portion $32a_1$ and $32b_1$ and a lower portion $32a_2$ and $32b_2$ adjacent a stop 35. Each of the ramps 32a and 32b form continuous inclines extending over arcs of about 120°. Alternately the raised portions $32a_1$ and $32b_1$ of the ramps 32a and 32b could extend together. The operative position is such that the high point of one ramp is directly opposite (i.e. 180°) from a low point on the other ramp next to the stop 35.

A pair of pins 42a and 42b are inserted into the pin holes 52a and 52b within the body member 50. Each pin has an associated spring 44a and 44b which biases the pins 42a and 42b toward the respective ramps 32a and 32b in the cap member 30. When assembled, the cap member 30 restrains the pins 42a and 42b within the pin holes 52a and 52b. Therefore as the cap member 30 rotates or is rotated relative to the body member 50, the second ends $42a_2$ and $42b_2$ of the pins 42a and 42b ride up and down the ramps 32a and 32b. When the second end of a pin such as $42a_2$ is at the top of a ramp such as $32a_1$, the first end $42a_1$ of the pin 42a extends inward through the face of body member 50 and contacts a stop 80 on the front disc 72 of spool 70. Therefore as the cap member 30 is rotated 120° relative to the body member 50, the pins 42a and 42b alternately extend and retract through the front face 50a of body member 50 as best viewed in FIGS. 2 and 3.

FIG. 2 illustrates the second end $42a_2$ of the pin 42a at the top portion $32a_1$ of its ramp 32a. The first end $42a_1$ of pin 42 extends through the front face 50a of body member 50 and contacts a stop 80 on the spool 70. Meanwhile the other pin 42b has its second end $42b_2$ at the bottom $32b_2$ of ramp 32b. Through the biassing by the spring 44b, the pin 42b is retracted and does not extend out past the front face 50a of cap member 50. As the cap member 30 is rotated 120° (as viewed in FIG. 3) the ramps 32a and 32b alternate the extending positions of the pins 42a and 42b. Specifically referring to FIG. 3, the second end $42b_2$ of pin 42a is at the bottom $32b_2$ of ramp 32a as urged by the biassing of spring 44a. Simultaneously the second end of pin 42b is at the top 32b of ramp 32b thereby compressing spring 44b and extending the first end $42b_1$ of pin 42b through the front face 50a of body member 50 where it can come in contact with a stop 80.

The assembly of the head 10 will now be described with reference to FIG. 4. Pins 42a and 42b are inserted through the springs 44a and 44b and then into the pin holes 52a and 52b of body member 50. The cap member 30 is then installed onto the body member 50 by inserting screw retainer 38 into the extended portion 51 of body member 50 trapping the pins 42a and 42b therebetween. The screw 34 is then inserted through washer 36 and screwed down into the screw retainer 38. The spool 70 with the line 75 wrapped therearound is inserted into the open end of the body member 50 with the line 75 threaded through the line port 54. The rear plate 25 is inserted over the shaft 20 and couples onto the body member 50. The body member 50 has clips 60 which correspond to slots 62 in the rear plate 25. The shaft 20 which is attached to the spool 70 extends through the rear plate 25 and is coupled to a rotating drive means (not shown).

The line release method will now be functionally described. As the cap member 30 is rotated 120° relative to the body member 50 (as moving from the position shown in FIG. 2 to the position shown in FIG. 3) the extended pin 42a of FIG. 2 releases the stop 80 on spool 70 and allows the spool 70 to rotate relative to the body member 50 until (as shown in FIG. 3) the pin 42b comes into contact with stop 80 thereby arresting the rotation of the spool 70 with the body member 50. It is this relative rotation of the spool 70 relative to the body member 50 which unwinds a specified length of line 75.

The amount of relative rotation permitted between the spool 70 and the cap member 50 is determined by the radial spacing of the stops 80 about the front disc 72 of spool 70. Referring to FIGS. 4 and 5, the spool 70 is shown to have five stops 80 radially spaced about the front disc 72. There is an arc of approximately 70° between adjacent stops 80. It is this distance between these adjacent stops which allows a proportionate amount of line to be released. The amount of line to be released can be selected by the number of stops 80 and spaces therebetween.

Functionally when the operator determines that additional line needs to be released, the head 10 is put in contact with a stationary object such as the ground while the head 10 is rotating. Once in contact with the ground, the cap member 30 is restrained from rotating relative to the body member 50. The cap member 30 then rotates about 120° until one of the pins 42a or 42b comes in contact with the stop 35. The pins 42a and 42b alternate their extended conditions (as described above) and permit the body member 50 to rotate relative to the spool 70 for the prescribed amount thereby releasing the predetermined length of line. Once the cap member 30 is released from contact with the ground, the biassing means which is shown as a spring 56 between the body member 50 and the cap member 30, returns the cap member 30 to its original position relative to body member 50. The head 10 is then ready for a subsequent line release sequence.

This functional method of releasing line differs from the methods of the prior art. The head need only be lightly contacted with the ground, rather than bumped, allowing line to be released without inadvertently bumping the head too hard and damaging the mechanism. Having no axial movement, the present invention is less likely to attract foreign material inside the mechanism since adjacent surfaces of moving parts are never outwardly exposed. Other advantages should be apparent from the drawings and this disclosure.

The head 10 may also be readily modified to accommodate multiple lines. One modification would comprise installing a second line port on the opposite side of the body member 50 from the first line port 54. A second line, also wrapped around the spool 70 (which may be compartmented to accommodate the two lengths of line) may be threaded through the second line port similarly to the line 75 through line port 54. The mechanism described above will simultaneously release a length of the second line as it releases a length of line 75. Alternately a second spool could be added, such as adjacent in series with the first spool 70.

Thus a string trimmer with automatic feed has been disclosed. While embodiments and application of this invention have been shown and described, it would be apparent to those skilled in the art that many more uses and modifications are possible without departing from the inventive concepts herein. The invention, therefore, is not to be restricted except in the spirit of the claims that follow.

What is claimed is:
1. A string trimmer comprising:
    a body member rotatably positionable about a main shaft, said body member generally having a cylindrical shape with a first closed end, a second open end, and a side wall having an aperture therein;
    a spool for holding line, said spool connectable to a main shaft and generally coaxially positioned within said body member inwardly of said closed end such that the line may be threaded through the aperture in said side wall;

a cap member rotatably connected to and positioned outward of said closed end of said body member; and means for releasing a length of line through rotation of said body member relative to said spool in response to temporarily restrained rotation of said cap member relative to said body member, wherein said cap member has an inward face adjacent said closed end of said body member and an outward face, said inward face having a series of ramps, wherein said means for releasing a length of line comprises rotational biasing means between said body member and said cap member for rotationally biasing said cap member to a first position relative to said body member, a plurality of stops radially spaced about an outward face of said spool, a first pin and a second pin extending through apertures in the closed end of said body member, each of said pins having a first end for contacting the stops on said spool and a second end for contacting the ramps on said cap, and means for biasing each of said pins against the ramps of said cap.

2. A string trimmer as in claim 1 further comprising a plurality of stops on said spool; and engaging means for selectively contacting and releasing certain of said stops during rotation of said body member relative to said spool.

3. A string trimmer as in claim 1 wherein as said cap member is temporarily restrained from rotating, said cap member is rotatable relative to said body member between the first position and a second position such that (1) when said cap is in said first position, the second end of said first pin is on the top of a ramp of said cap with the first end of said first pin moved into contact with a stop on said spool and the second end of said second pin is at the bottom of a ramp of said cap with the first end of said second pin retracted without contacting a stop on said spool and (2) when said cap is moved to said second position, the second end of said second pin rides up to the top of a ramp of said cap thereby moving the first end of said second pin into contact with a stop on said spool and the second end of said first pin slides down to the bottom of a ramp of said cap thereby retracting the first end of said first pin from a stop on said spool.

4. A string trimmer comprising:
a main shaft;
a rotary drive means coupled to said main shaft for rotating said main shaft in a first rotary direction;
a body member rotatably positioned about said main shaft, said body member having an inward end axially adjacent said rotary drive means, an outward end axially outward from said rotary drive means, and a side wall having an aperture therein;
a spool containing line wrapped therearound, said spool being coupled to said main shaft and positioned within said body member such that the line may be threaded through the aperture in said side wall;
a cap member coupled to said outward end of said body member, said cap member being radially rotationally adjustable between a first and a second position relative to said body member, said cap member being rotationally biased in said first rotary direction to said first position; and connecting means between said spool and said body member, said connecting means (1) rotationally connecting said spool to said body member when said cap member is in said first position and (2) permitting a given degree of rotation of said body member relative to said spool when said cap member is in said second position.

5. A string trimmer as in claim 4 wherein said spool has at least two lines and said body member has an aperture for each of said lines.

6. A string trimmer as in claim 4 wherein said spool releases a given length of line in response to temporarily restrained rotation of said cap member.

7. A string trimmer as in claim 4 wherein said connecting means comprises:
rotational biasing means between said body member and said cap member for rotationally biasing said cap member relative to said body member;
a first pin and a second pin extending through the outward end of said body member; and
means for biasing each of said pins against said cap, said cap member having an inward face and an outward face, said inward face having a ramp and a stop for each of said pins, said spool having a plurality of stops radially spaced about an outward face, each of said pins having a first end contactable with the stops on said spool and a second end contactable with the stops and the ramps on said cap.

8. A string trimmer as in claim 7 wherein while said trimmer is in a rotating condition, as said cap member is contacted with an object, said cap member is rotatable relative to said body member from said first position to said second position such that (1) when said cap is in said first position, the second end of said first pin is on the top of a ramp of said cap with the first end of said first pin moved into contact with a stop on said spool and the second end of said second pin is at the bottom of a ramp of said cap with the first end of said second pin retracted without contacting a stop on said spool and (2) when said cap is moved to said second position, the second end of said second pin rides up to the top of a ramp of said cap thereby moving the first end of said second pin into contact with a stop on said spool and the second end of said first pin slides down to the bottom of a ramp of said cap thereby retracting the first end of said first pin from a stop on said spool.

9. A string trimmer as in claim 4 wherein said spool has at least two lines and said body member has an aperture for each of said lines.

10. The method for unwinding a given length of line from a string trimmer comprising the steps of:
rotating a body member with a spool of line therein in a first angular direction, said body member having a cap member on its outward end rotating with said body member, said cap member being rotatable relative to said body member between a first angular position and a second angular position;
temporarily restraining said cap member thereby rotating said cap member relative to said body member from the first angular position to the second angular position;
releasing said body member relative to said spool for a given angular amount in response to the rotating of said cap member relative to said body member thereby allowing a length of line to be unwound; and
returning said cap member to the first angular position.

* * * * *